G. HONOLD.
COUPLING FASTENER.
APPLICATION FILED OCT. 24, 1911.

1,167,558.

Patented Jan. 11, 1916.

WITNESSES
F. A. Hennessy
M. A. Beitz

INVENTOR
Gottlob Honold
By Pennie Davis & Goldsborough
Attys.

UNITED STATES PATENT OFFICE.

GOTTLOB HONOLD, OF STUTTGART, GERMANY, ASSIGNOR TO THE FIRM OF ROBERT BOSCH, OF STUTTGART, GERMANY.

COUPLING-FASTENER.

1,167,558.   Specification of Letters Patent.   Patented Jan. 11, 1916.

Original application filed September 23, 1910, Serial No. 583,378. Divided and this application filed October 24, 1911. Serial No. 656,493.

*To all whom it may concern:*

Be it known that I, GOTTLOB HONOLD, a subject of the Emperor of Germany, and resident of Stuttgart, Germany, have invented certain new and useful Improvements in Coupling-Fasteners; and I do hereby declare the following to be a full, clear, and exact description of the invention, such as will enable others skilled in the art to which it appertains to make and use the same.

The present invention has to do with devices for coupling together the abutting ends of shafts, and relates particularly to mechanism permitting the exact adjustment of the parts of such a device.

The invention is peculiarly serviceable in connection with the coupling of the armature shaft of an electric ignition machine to the driving shaft which is in turn driven from the crank shaft of an internal combustion engine. In couplings of that kind, it is of great practical importance that the two coupled shafts, *i. e.*, the driving shaft actuated by the engine and the armature shaft of the ignition machine, should be brought into and held in a definite relative position so that the ignition will occur when the electromotive force generated by the ignition machine attains the desired value, which is usually at or near its maximum.

Figure 1:
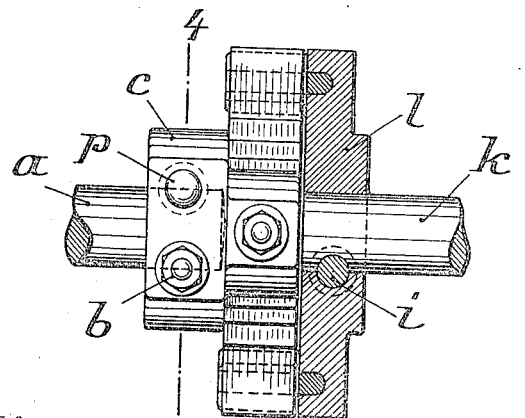
Figure 2:
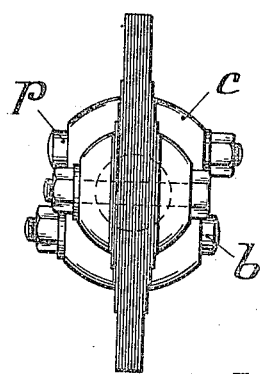
Figure 3:
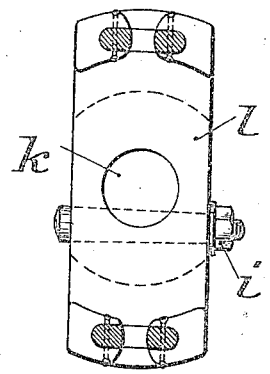
Figure 4:
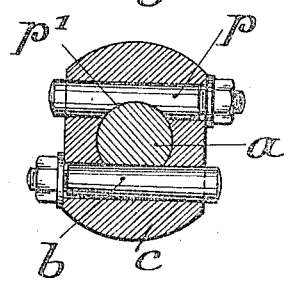

In the accompanying drawings illustrating the preferred embodiment of my invention applied to couplings for axially abutting shafts, Figure 1 is a side view, partly in section, of a coupling with the fastening devices in place; Fig. 2 is an end view of the coupling part on one shaft with its fastening device in place; Fig. 3 is an end view of the coupling part on the other shaft; and Fig. 4 is a section on the line 4—4 of Fig. 1 showing particularly the fastening devices.

The particular coupling device shown in the drawings forms no part of my present invention but is described and claimed in my application for United States Letters Patent Serial No. 583,378, filed September 23, 1910, of which this application is a division.

The coupling part $l$ is fastened on its shaft $k$ by the wedge pin $i$ in the usual way. The other coupling part is then carefully adjusted into, and secured in the correct position by the following mechanism. In the hub of the coupling disk $c$ a cylindrical hole is bored, into which is inserted a cylindrical bolt $p$ which has on one side a circular segment-shaped recess $p'$ fitting the cylindrical surface of the shaft. To adjust the coupling part $c$ on the shaft, the bolt $p$ is first placed in its cylindrical hole with the recess in position to receive the cylindrical surface of the shaft, and the hub of the coupling parts $c$ and $l$ are then brought into coupling engagement and the nut of the bolt $p$ is screwed up to such an extent that the hub $c$ can be shifted only with difficulty around the shaft. Thereupon the armature is brought exactly into the position which it is to have when running and the nut of the bolt $p$ is further tightened. Hub $c$ is thereby exactly fixed on the shaft $a$. On the side opposite the bolt $p$, the hub is provided with a second tangential bore for the reception of a wedge pin $b$. The shaft $a$ at this place, however, is yet left round, so that its periphery projects into the bore for the wedge $b$. The portion of the shaft's periphery projecting into the bore is thereupon removed by boring or filing. When thereafter the wedge pin $b$ is drawn in and clamped fast by the aid of its nut, the coupling is fixed upon the shaft exactly in the adjusted position.

Having thus described my invention, what I claim is:

1. The combination with an armature shaft and a driving shaft, the best angular relation of which can be determined only by trial rotations, said shafts having abutting ends and being in axial alinement, of coupling mechanism therefor comprising a coupling member rigidly secured to one shaft, a second coupling member engaging therewith and mounted on the other shaft, and a pair of securing devices comprising means for holding said second coupling member on its shaft, one of said securing devices being shaped with a shoulder which bears against a smooth portion of said last named shaft to permit said second coupling member to turn on its shaft, but with difficulty, while the trial rotation is being made, and the other securing device holding said coupling rigidly to its shaft when its final adjusted position has been determined by the trial rotation.

2. The combination of a pair of axially alined shafts, the best angular relation of which can be determined only by trial rotation while coupled together, one being an armature shaft and the other a driving shaft, and coupling mechanism therefor comprising a coupling member rigidly secured to one shaft, a second coupling member coöperatively engaging therewith and mounted on the other shaft, and a pair of securing devices for said second coupling member, one of said devices consisting of a bolt extending through the coupling member and having a shoulder yieldingly gripping the cylindrical surface of the shaft, and the other of said devices rigidly locking its coupling member to said shaft.

3. The combination of a pair of axially alined shafts, the best angular relation of which can be determined only by trial rotation while coupled together, and coupling mechanism therefor comprising a coupling member rigidly secured to one shaft, a second coupling member coöperatively engaging therewith and mounted on the other shaft, and a pair of securing devices for said second coupling member, one of said devices consisting of a bolt cut away to fit the circular curvature of the shaft and forming a shoulder yieldingly gripping the cylindrical surface of the shaft to permit its coupling member to turn on said shaft, but with difficulty, while the trial rotation is being made, and the other securing device consisting of a wedge pin fitted in a recess of said shaft and rigidly locking its coupling member against rotation from its final adjusted position, as determined by the trial rotation.

4. The combination of a pair of axially alined shafts, the best angular relation of which can be determined only by trial rotation while coupled together, and coupling mechanism therefor, comprising a coupling member rigidly secured to one shaft, a second coupling member operatively engaging therewith and mounted on the other shaft, and a pair of securing devices for said second coupling member, one of said devices consisting of a bolt extending through the coupling member and cut away at the shaft to form a shoulder for yieldingly gripping the cylindrical surface, said bolt being adjusted to permit said second coupling member to turn on its shaft, but with difficulty, while the trial rotation is being made, and the second of said securing devices consisting of a wedge pin passing through the coupling member and fitted to a recess of said shaft to rigidly lock said coupling member against rotation on said shaft after said coupling member has been adjusted to its final position by trial rotation with the opposing member.

5. The combination of a shaft having a recess in one side, a coupling member mounted thereon, a bolt passing through said coupling member and having a shoulder which grips the cylindrical surface of said shaft but permits rotation thereof with respect to said coupling member, though with difficulty, and a locking pin in said coupling member fitted to the recess of said shaft for rigidly securing said coupling member against rotation on said shaft.

In testimony whereof I affix my signature in presence of two witnesses.

GOTTLOB HONOLD.

Witnesses:
WALTHER STEINCKE,
REINHOLD ELWERT.